(12) United States Patent
Lau

(10) Patent No.: US 7,133,945 B2
(45) Date of Patent: Nov. 7, 2006

(54) SCALABLE I/O SIGNALING TOPOLOGY USING SOURCE-CALIBRATED REFERENCE VOLTAGES

(75) Inventor: Benedict C. Lau, San Jose, CA (US)

(73) Assignee: Rambus Inc., Los Altos, CA (US)

( * ) Notice: Subject to any disclaimer, the term of this patent is extended or adjusted under 35 U.S.C. 154(b) by 237 days.

(21) Appl. No.: 10/942,720

(22) Filed: Sep. 15, 2004

(65) Prior Publication Data

US 2006/0066351 A1    Mar. 30, 2006

(51) Int. Cl.
*G06F 13/00* (2006.01)
*G11C 5/14* (2006.01)

(52) U.S. Cl. ..................... 710/104; 365/226
(58) Field of Classification Search ............. 710/104, 710/105, 300–304; 713/300, 310; 365/226
See application file for complete search history.

(56) References Cited

U.S. PATENT DOCUMENTS

| | | | | |
|---|---|---|---|---|
| 5,521,530 | A | | 5/1996 | Yao et al. ............... 326/80 |
| 5,534,812 | A | * | 7/1996 | Cao et al. ............... 327/333 |
| 5,646,548 | A | | 7/1997 | Yao et al. ............... 326/80 |
| 5,712,586 | A | * | 1/1998 | Kitao ..................... 327/333 |
| 6,072,334 | A | * | 6/2000 | Chang .................... 326/82 |
| 6,185,145 | B1 | * | 2/2001 | Merritt ................... 365/226 |
| 6,275,066 | B1 | * | 8/2001 | Park et al. .............. 326/86 |
| 6,282,146 | B1 | * | 8/2001 | Guo et al. .............. 365/230.06 |
| 6,525,964 | B1 | * | 2/2003 | Tanaka et al. .......... 365/185.18 |
| 6,680,755 | B1 | * | 1/2004 | Shen et al. ............. 348/674 |
| 6,792,489 | B1 | * | 9/2004 | Osburn et al. .......... 710/104 |
| 2002/0036516 | A1 | * | 3/2002 | Petty ...................... 326/80 |
| 2003/0233590 | A1 | * | 12/2003 | Liu ......................... 713/300 |
| 2004/0268161 | A1 | * | 12/2004 | Ross ....................... 713/300 |

OTHER PUBLICATIONS

Johnson, C., "Graphics DDR3 On-Die Termination and Thermal Considerations," Micron Designline, vol. 12, issue 1, 2003.
Specification Sheet re Micron Graphics DDR3 DRAM, Micron Technology, Inc., 2003.

* cited by examiner

*Primary Examiner*—Rehana Perveen
*Assistant Examiner*—Trisha Vu
(74) *Attorney, Agent, or Firm*—Morgan, Lewis & Bockius LLP

(57) ABSTRACT

An embodiment of the invention is a scalable I/O interface signaling technology for improved communication between semiconductor devices. In one embodiment, a system contains a first semiconductor device that includes a first characterization mechanism, a control logic coupled to the first characterization mechanism, a voltage generating mechanism coupled to the control logic and a transmit buffer. The control logic adjusts at least a first voltage generated by the voltage generating mechanism based on at least a value determined by the first characterization mechanism. The first voltage is coupled to the transmit buffer to define at least a transmit voltage signal level. In an alternate embodiment, the first voltage is coupled to a receive buffer in a second semiconductor device to define at least a receive voltage signal level.

34 Claims, 13 Drawing Sheets

SCALABLE I/O SIGNALING TOPOLOGY USING SOURCE-CALIBRATED REFERENCE VOLTAGES

BRIEF DESCRIPTION OF THE INVENTION

The present invention relates generally to interfaces. More specifically, the present invention relates to a scalable input-output interface signaling technology for communication between semiconductor devices.

BACKGROUND OF THE INVENTION

As critical dimensions in semiconductor devices are reduced, the maximum voltage (e.g., power supply voltages) used by such devices are also scaled. For example, a maximum power supply voltage, Vdd, used by semiconductor device scales with gate-oxide thickness. The scaling of termination voltages, voltage swings and/or a common mode voltage used in signaling between semiconductor devices or ICs, however, often lags behind the changes in the power supply voltages. As a consequence, it is increasingly difficult to communicate between two semiconductor devices having different manufacturing process generations using the same signaling technology, with a fixed termination voltage, voltage swing and/or common mode voltage.

In the case of a semiconductor memory, such as dynamic random access memory (DRAM), communicating between semiconductor devices having different signaling levels poses challenges in the design of an input-output (I/O) interface in a controller. For example, the I/O device signaling levels may be higher than those in the core of the memory device. In addition, in a bi-modal design, such as when the controller needs to communicate with both 1.2V (XDR) and 1.8V (DDR2) DRAM, circuits in the I/O interface must be able to handle signals at both of these voltages with different voltage swing and common mode requirements.

To overcome these limitations, there is a need for an improved I/O interface signaling technology for use in communication between semiconductor devices.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
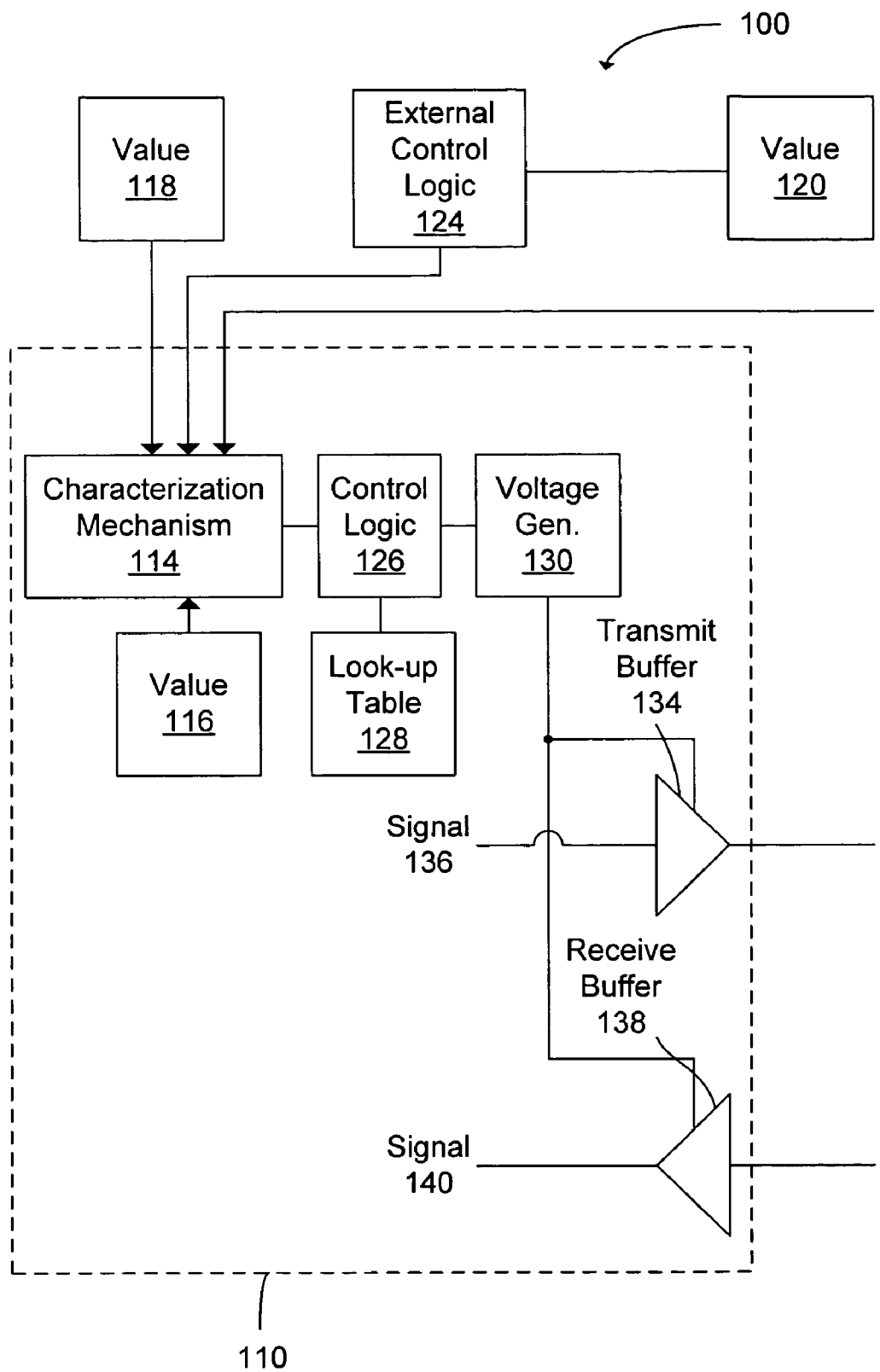
FIG. 1 is a block diagram illustrating an embodiment of the present invention.

As described in more detail below, in some embodiments a system contains a first semiconductor device that includes a first characterization mechanism, a control logic coupled to the first characterization mechanism, a first voltage generating mechanism coupled to the control logic and a first transmit buffer. The control logic adjusts at least a first voltage generated by the first voltage generating mechanism based on at least a value determined or generated by the first characterization mechanism. The first voltage is coupled to the first transmit buffer to define at least a transmit voltage signal level. In this way, adjustments of the first voltage may improve a performance metric of the system. In some embodiments, the control logic may adjust the first voltage at intermittent or periodic time intervals. The first voltage may be a termination voltage, a high or low signal voltage, or a common mode voltage, for example.

In various embodiments the first characterization mechanism may include a manufacturing process detector, a voltage calibration logic, a voltage margining control, a processor activity detecting mechanism, a data rate detecting mechanism, a power state detecting mechanism, a PC Bus receiving detector, or a DRAM core busy detector. In some embodiments, the first semiconductor device also includes a first receive buffer in the first semiconductor device, where the first voltage is coupled to the first receive buffer to define at least a receive voltage signal level.

The first semiconductor device may also include an output voltage buffer. In addition, a second semiconductor device may include an input voltage buffer and a receive buffer. One end of an interconnect having at least one voltage control line is coupled to the first semiconductor device and another end to the second semiconductor device. The first voltage in the first semiconductor device is coupled to the receive buffer in the second semiconductor device via the output voltage buffer, the voltage control line in the interconnect and the input voltage buffer. In this way, the first voltage defines at least a receive voltage signal level for at least one signal communicated from the first semiconductor device to the second semiconductor device via the first transmit buffer, the interconnect and the receive buffer. In some embodiments, the second semiconductor device may also include a second transmit buffer in the second semiconductor device. The first voltage is coupled to the second transmit buffer and thereby defines at least a transmit voltage signal level for at least one signal communicated from the second semiconductor device to the first semiconductor device. Additional details of the various embodiments are described below.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

FIG. 1 illustrates a system 100 for a scalable input-output (I/O) interface signaling technology. A first semiconductor device 110 includes a first characterization mechanism 114 for determining a value 116 internal to the device 110, and/or a value 118 external to the device 110. In addition, a value 120 may be modified by external control logic 124 prior to providing the value 120 to the first characterization mechanism 114. The first characterization mechanism 114 provides at least one of the determined values 116, 118 or 120 to a control logic 126. The control logic 126 is coupled to a first voltage generating mechanism 130, one example of which is a digital-to-analog converter (DAC). The control logic 126 adjusts a first voltage generated by the voltage generating mechanism 130 based on at least one of the values 116, 118 or 120. The control logic 126 may determine the desired adjustment to the first voltage from an optional look-up table 128, which may be coupled to the control logic 126, using at least one of the values 116, 118, 120. The optional look-up table 128 may be controlled by external inputs or software. The first voltage is coupled to a first transmit buffer 134 to define at least a transmit voltage signal level for signal 136. In some embodiments, the first voltage may also be coupled to an optional first receive buffer 138 to define a receive voltage signal level for an input signal 140. Alternately, different voltages may be coupled to the first transmit buffer 134 and the first receive buffer 138. By adjusting the transmit voltage signal level and/or the receive voltage signal level, a performance metric of the system 100 may be improved. Examples of a suitable performance metric are listed below.

The first characterization mechanism 114 may include a manufacturing process detector, a voltage calibration logic, a voltage margining control, a processor activity detecting mechanism, a data rate detecting mechanism, a power state detecting mechanism, a PC Bus receiving detector or a DRAM core busy detector. The first characterization mechanism 114 may also include a plurality of these mechanisms. More detailed examples of the characterization mechanism are described below.

The control logic 126 in the system 100 may adjust the first voltage at intermittent time intervals or at periodic time intervals. The control logic 126 may also be included in a feedback loop. For example, a predetermined data pattern may be sent as signal 136 to another device using the transmit buffer 134. A receive data pattern corresponding to the signal 140 is received from the other device using the receive buffer 138. The receive data pattern is compared to the predetermined data pattern to determine whether the communication was successful. This process may be repeated several times while the first voltage from the voltage generating mechanism 130 sent to the transmit buffer 134 or the receive buffer 138 is swept across a range of first voltages allowing an optimal first voltage, for example, one with the largest margin for successful communication, to be determined.

An exemplary characterization mechanism that functions as a manufacturing process detector may use a delay locked loop circuit to detect variance in manufacturing that may occur in different localities of a semiconductor device or between different semiconductor devices of the same type. A delay locked loop ("DLL") includes a control voltage to control the delay of a number of delay elements coupled in series to generate a delayed clock signal. The delay locked loop also includes a phase detector that detects a phase difference between the generated delayed clock signal and a reference clock signal and adjusts the delay of the delayed clock signal based on the detected difference. A circuit such as a charge pump and filter, or digital logic that includes a counter and a digital to analog converter, may be used to generate the control voltage based on whether the phase of the delayed clock signal leads or lags the reference clock signal. The control voltage may be used to indicate differences in semiconductor device process at a predetermined frequency. For example, a digital "up/down" output of the phase detector (e.g., "up" specifies increasing the control voltage and "down" specifies decreasing the control voltage) can modify a digital count value held in a counter circuit using digital logic. The digital count value may be applied to a digital to analog converter to generate the control voltage. The digital count value may be used as a (digital) manufacturing process detector. At a predetermined (e.g., a fixed) frequency, a change in the digital count value indicates a change in semiconductor device process from one integrated circuit to another. The control voltage (e.g., digital count value) of the delayed clock signal also tracks changes in operating temperature and voltage supply.

Power state detecting mechanisms may utilize power state mechanisms of integrated circuit devices. For example, state machine circuitry may be used to implement and manage different power states. Specific register bits of the state machine can be employed to indicate and/or set which power state mode the integrated circuit is operating in. An exemplary power state detecting mechanism may include the values stored in the register bits of the state machine. Different power states may be effectuated by lowering the frequency of the clock signal used to synchronize operations on a chip, changing the output voltage swing of output drivers at the pin interface of a semiconductor device, lowering the data rate at which the integrated circuit device transfers data with other integrated circuit devices, and/or shutting down specific portions of circuitry on the integrated circuit device. Other examples include shutting down or lowering the frequency of a delay locked loop or phase locked loop circuit or shutting down specific clock trees that are tied to these circuits. In an example, an integrated circuit device includes two operating data rate modes, for example 5 Gigabits per second for every pin of the device, and 2.5 Gigabits per second for every pin of the device. These two operating modes may be set using a dedicated pin of the integrated circuit device, by setting a fuse circuit on the device, via a value stored or programmed in a register of the device, or via a specific instruction sent to the device. Any of these various mechanisms used to establish the power modes may also be used to establish and thus act as a power state detecting mechanism.

In another example of a power detecting mechanism, a memory device may include a "standby mode" where a delay locked loop circuit is shut down, along with input receivers. The standby mode may be exited and the delay locked loop and receivers turned to place the device in a normal mode. These various modes may be detected by respective values stored in registers or by detecting respective commands that are used to place the memory device in these various states.

Figure 7:
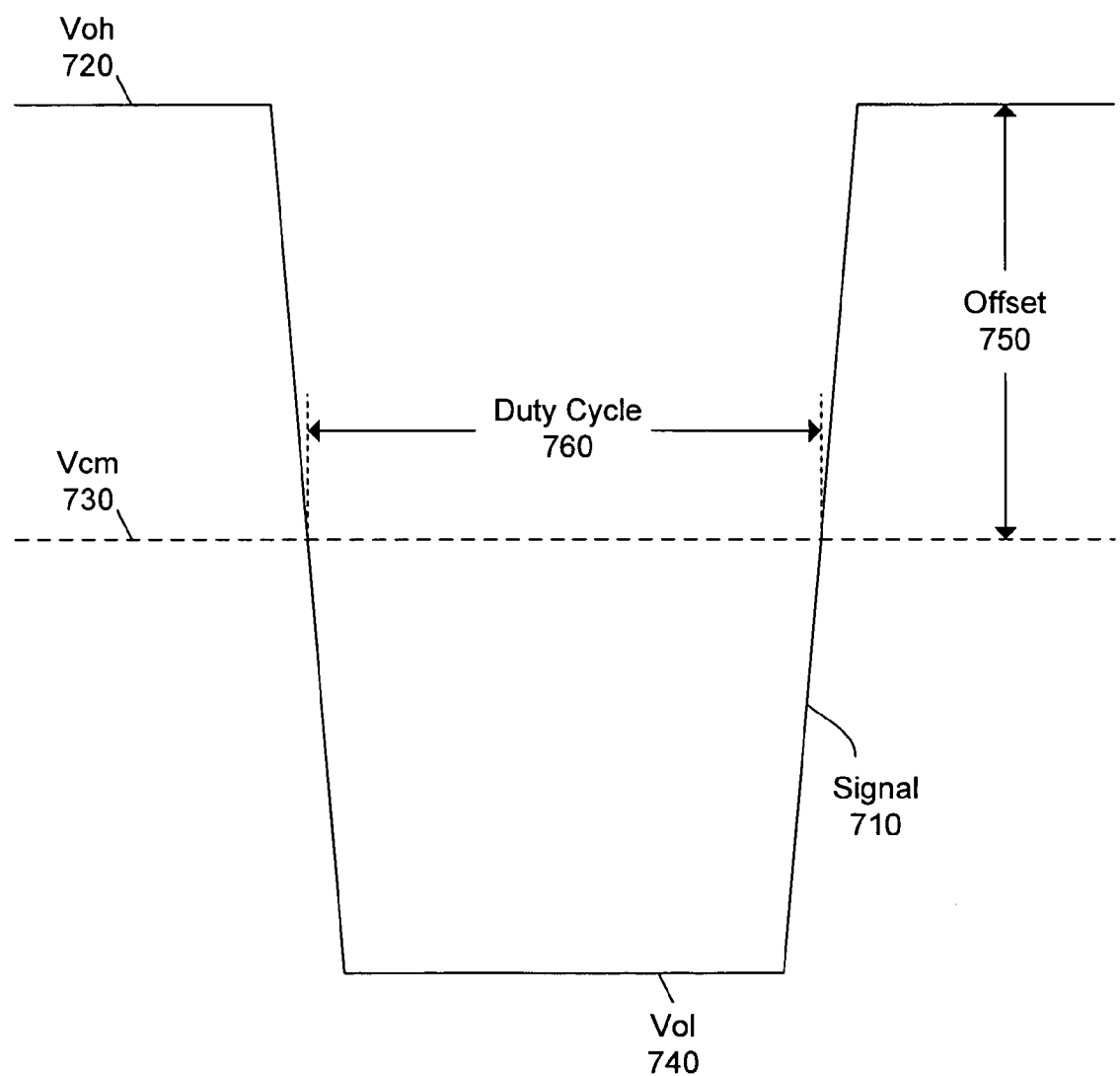
FIG. 7 illustrates voltage levels for a signal in an embodiment of the present invention with a single-ended input-output interface.

Embodiments of the system 100 are compatible with a variety of I/O interfaces. FIG. 7 illustrates a signal 710 in a system with a single-ended I/O interface, which may or may not be terminated. Signaling levels in the system correspond to a Rambus Signaling Level (RSL) protocol. There is a high-voltage level Voh 720 and a low-voltage level Vol 740 about a common mode or common voltage Vcm 730. In I/O interfaces that are terminated, Voh 720 is referred to as a termination voltage Vterm. Vcm 730 is also referred to as a reference voltage Vref. In the context of the present invention, by adjusting Vcm 730, an offset 750 and a duty cycle 760 of the signal 710 may be modified. The offset 750 may be adjusted by setting a value of a difference between Vcm 730 and Vol 740. In some embodiments, control voltages corresponding to Vcm 730, Voh 720 and/or Vol 740 may be generated by the voltage generating mechanism 130. This allows independent adjustment of Vcm 730, Voh 720 and/or Vol 740.

Figure 8:
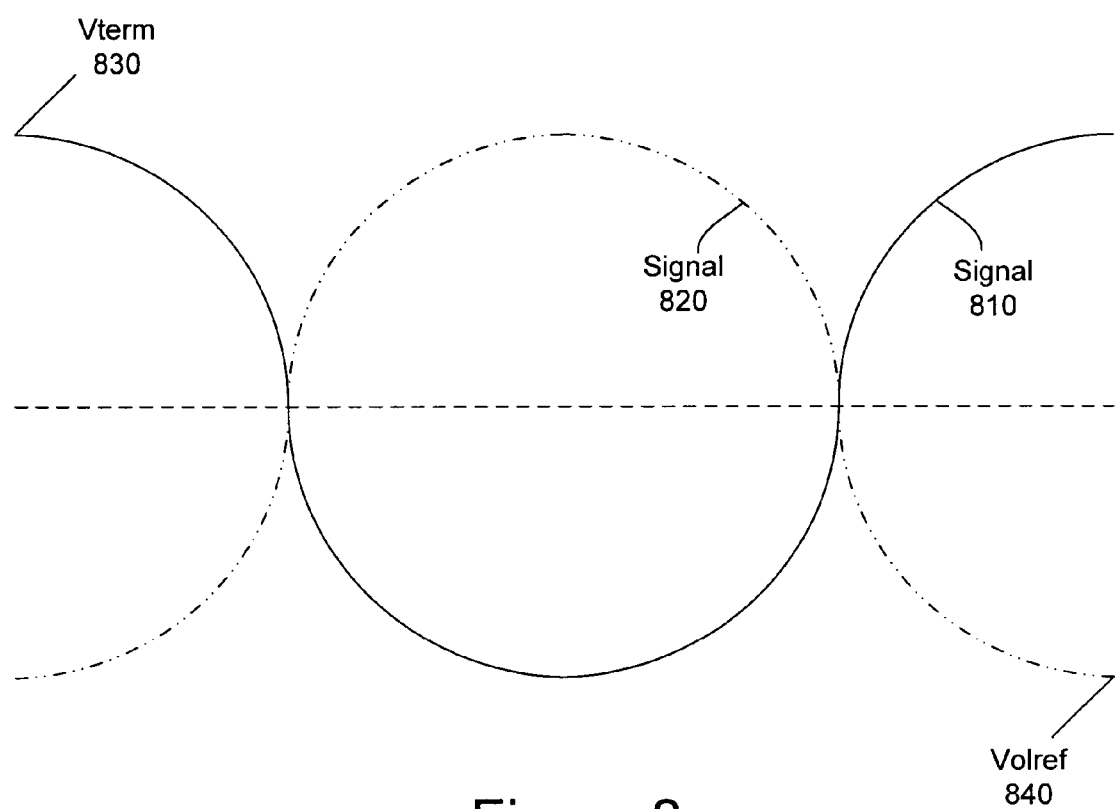
FIG. 8 illustrates voltage levels for signals in an embodiment of the present invention with a differential input-output interface.

FIG. 8 illustrates a signal 810 and a signal 820 in a system with a differential I/O interface, which is terminated. Signaling levels in this illustration correspond to a Differential Rambus Signaling Level (DRSL) protocol. A termination voltage Vterm 830 defines a high voltage level and Volref 840 a low voltage level. Vterm 830 is also referred to as Voh. Volref 840 is also referred to as Vol. By adjusting Volref 840, the voltage swing may be modified. In some embodiments, control voltages corresponding to Vterm 830 and/or Volref 840 may be generated by the voltage generating mechanism 130.

In light of the discussion of FIG. 7 and FIG. 8, the first voltage in the system 100 (shown in FIG. 1) may by Vterm, Voh, Vol or Vcm.

Figure 11:
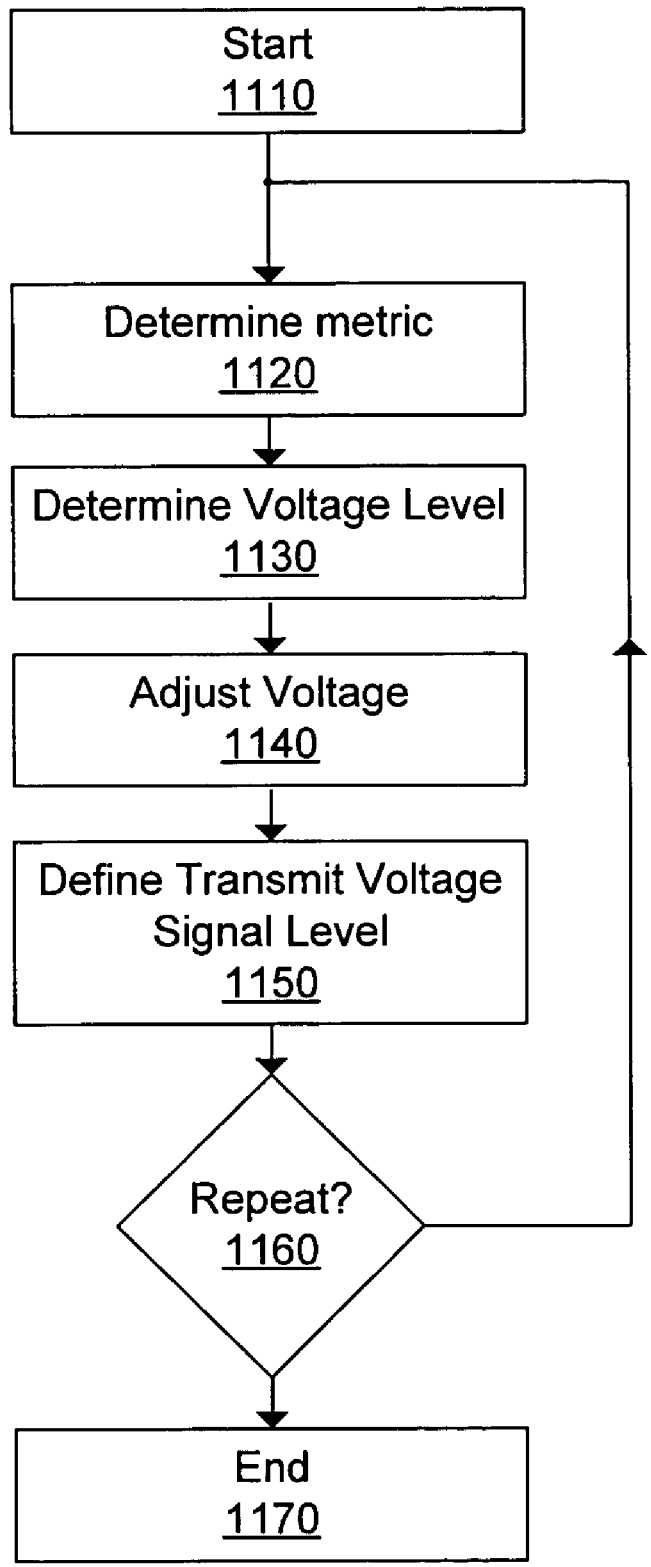
FIG. 11 is a flow diagram illustrating an embodiment of the present invention.

FIG. 11 is a flow chart of a method or process of operating a system such as the system 100. After the process starts 1110, a metric, related to a performance metric to be improved, is determined 1120. Based on at least this metric, a voltage level is determined 1130. A voltage is adjusted 1140 based on the determined voltage level. The voltage defines at least the transmit voltage signal level 1150. In some embodiments, a decision is made to determine if the process should be repeated 1160. For instance, 1160 may represent a determination as to whether the metric requires improvement, or a determination that an attempt to improve the metric is worthwhile. If yes, the process repeats, and otherwise it ends 1170. If the process ends 1170, the voltage level may be the same as that used in operation 1150 or the voltage level output may be disabled.

The metric may include the voltage swing of an output from the first semiconductor device 110, the offset 750 of the output from the first semiconductor device 110, the duty cycle 760 of the output from the first semiconductor device 110, an attenuation of the output from the first semiconductor device 110 at high data rates, a voltage swing of an input to the first semiconductor device 110, the offset 750 of the input to the first semiconductor device 110, the duty cycle 760 of the input to the first semiconductor device 110, the attenuation of the input to the first semiconductor device 110 at high data rates, a reference voltage (e.g., a threshold voltage) used at the input to the first semiconductor device 110, the common voltage or reference voltage Vcm 730 of the output from the first semiconductor device 110, a power consumption of the system 100, a temperature of the system 100, the power consumption of the first semiconductor device 110, the temperature of the first semiconductor device 110, a process used to manufacture the first semiconductor device 110, or the process used to manufacture at least a portion of the system 100, or any combination of these. One or more of these metrics may correspond to a value 120 used or sensed by external control logic 124.

Figure 2:
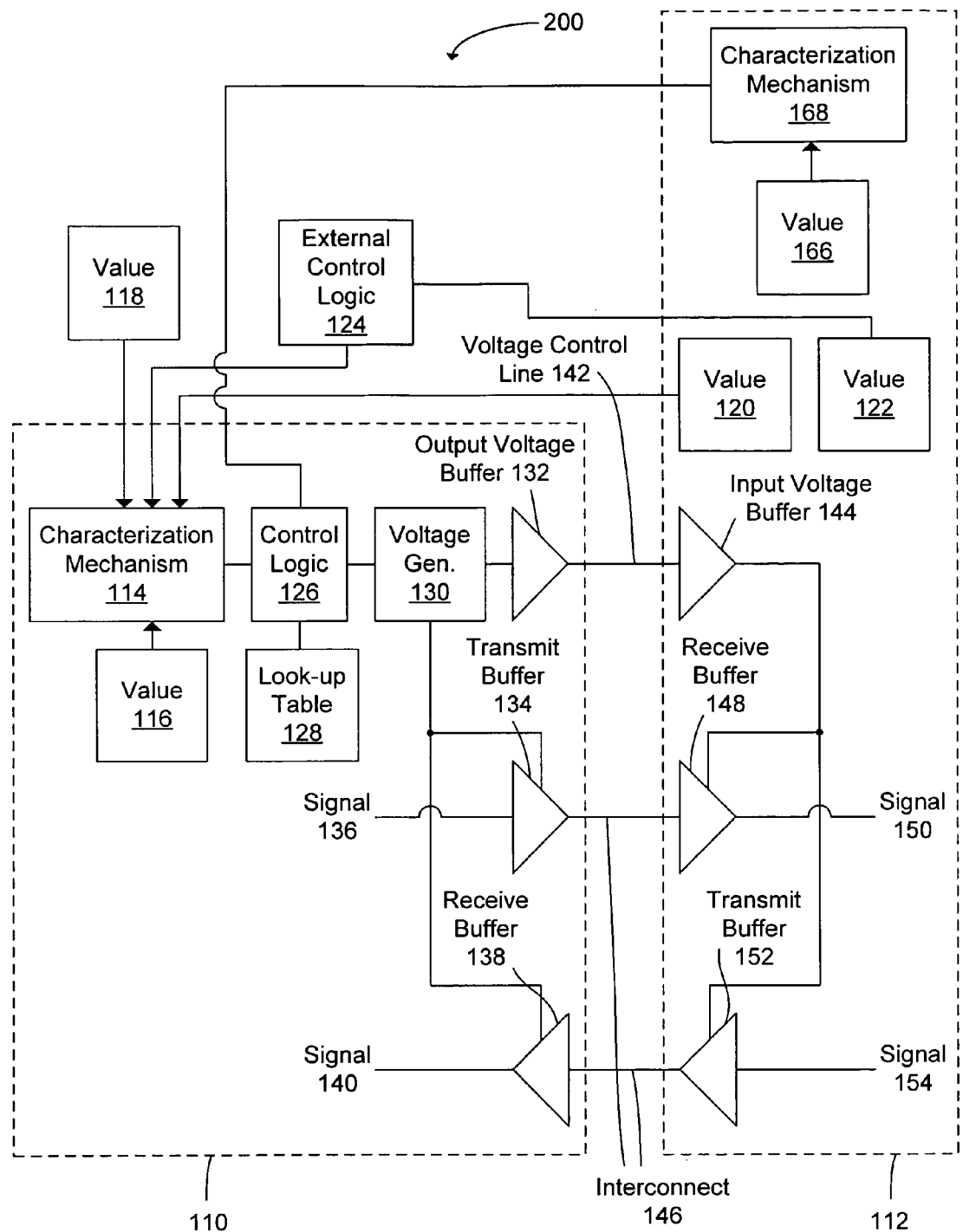
FIG. 2 is a block diagram illustrating an embodiment of the present invention.

FIG. 2 illustrates a system 200 that includes a second semiconductor device 112. The following description of system 200 addresses only those elements of system 200 which differ from those described above with reference to FIG. 1. The first voltage from the voltage generating mechanism 130 is coupled to the second semiconductor device 112 via an output voltage buffer 132, a voltage control line 142 and an input voltage buffer 144. The first voltage is coupled to a second receive buffer 148 to define at least one receive voltage signal level for a signal 150 communicated from the first semiconductor device 110 to the second semiconductor device 112 via interconnect 146.

The first voltage may also be coupled to an optional second transmit buffer 152 to define at least one transmit voltage signal level for a signal 154 communicated from the second semiconductor device 112 to the first semiconductor device 110 via interconnect 146. As shown here, the reference voltage adjustment mechanisms and methods described in this document may be applied to uni-directional or bi-directional communication between the first semiconductor device 110 and the second semiconductor device 112. By adjusting the first voltage, and thus the transmit voltage signal level or the receive voltage signal level in the first semiconductor device 110 or the second semiconductor device 112, a performance metric of the system 200 is improved.

In some embodiments, the second semiconductor device 112 does not include the input voltage buffer 144, in which case the first voltage on the voltage control line 142 is coupled to the second receive buffer 148 without use of an input voltage buffer 144. However, a calibration/conditioning circuit in the second semiconductor device 112 may be necessary to modify the first voltage before it is coupled to the second receive buffer 148 or the second transmit buffer 152. Similarly, in some embodiments that include the input voltage buffer 144, a calibration/conditioning circuit is provided between the input voltage buffer and the second transmit buffer 152 so as to modify the first voltage before it is coupled to the second transmit buffer 152.

The second semiconductor device 112 in the system 200 may include an optional second characterization mechanism 168 for determining a value 166. In this embodiment, the value 166 is provided to the control logic 126 in the first semiconductor device 110. The control logic 126 may adjust the first voltage generated by the voltage generating mechanism 130 based on the value 166.

The second characterization mechanism 168 may include a manufacturing process detector, voltage calibration logic, a voltage margining control, a processor activity detecting mechanism, a data rate detecting mechanism, a power state detecting mechanism, a PC Bus receiving detector or a DRAM core busy detector. The second characterization mechanism 168 may also include a plurality of these mechanisms.

As in the system 100 (shown in FIG. 1), the first voltage in the system 200 may include Vterm, Voh, Vol or Vcm. In some embodiments, the first voltage, as produced by the voltage generator 130 or the output voltage buffer 132 is a low current voltage signal that is then used to generate a higher current version of the same voltage (or a corresponding voltage) elsewhere, such as in the second circuit 112. In this way, the voltage generator 130 and/or output voltage buffer 132 do not need to supply a substantial amount of current in order to maintain the first voltage.

In some embodiments, the control logic 126 adjusts a plurality of voltages generated by the voltage generating mechanism 130. These voltages may be coupled to a plurality of output voltage buffers, transmit buffers and/or receive buffers in the first semiconductor device 110. In variations on embodiments of the scalable input-output interface signaling technology, there may be a plurality of voltage generating mechanisms, such as the first voltage generating mechanism 130. The plurality of voltage generating mechanisms may generate separate and distinct voltages coupled to the first transmit buffer 134 and the first receive buffer 138 based on the control logic 126.

Figure 3:
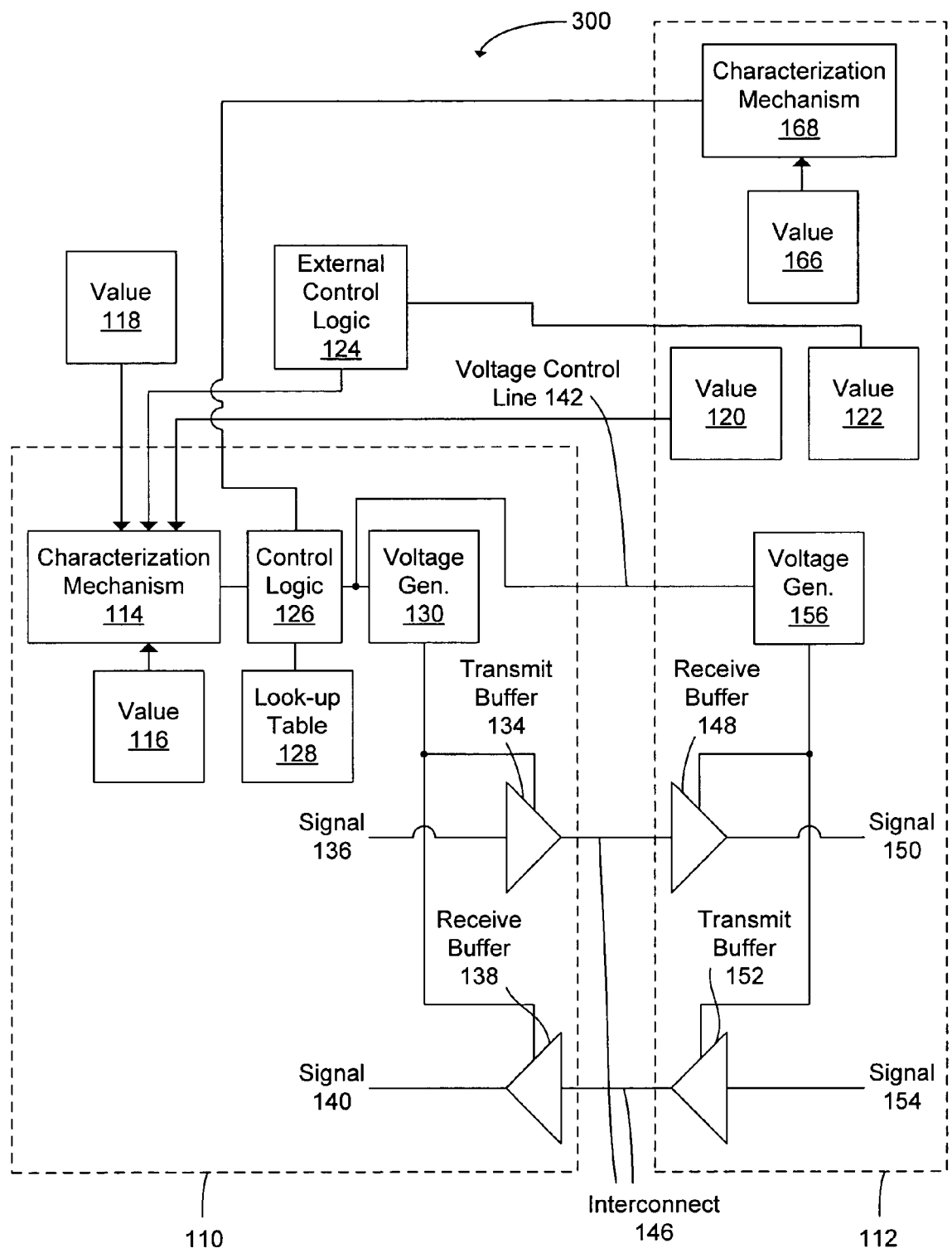
FIG. 3 is a block diagram illustrating an embodiment of the present invention.

In another variation, shown in FIG. 3, the control logic 126 adjusts one or more voltages generated by a second voltage generating mechanism 156 (e.g., a digital-to-analog converter). The one or more voltages (sometimes herein called a second voltage) produced by the second voltage generating mechanism 156 may be coupled to a plurality of input voltage buffers, transmit buffers and receive buffers in the second semiconductor device 112. In yet another variation, there are a plurality of semiconductor devices that are coupled to the first semiconductor device 110 via a bus I/O interface. The control logic 126 in the first semiconductor device 110 functions as a master for adjusting at least the first voltage in both the first semiconductor device and at least two of the other semiconductor devices.

Figure 12:
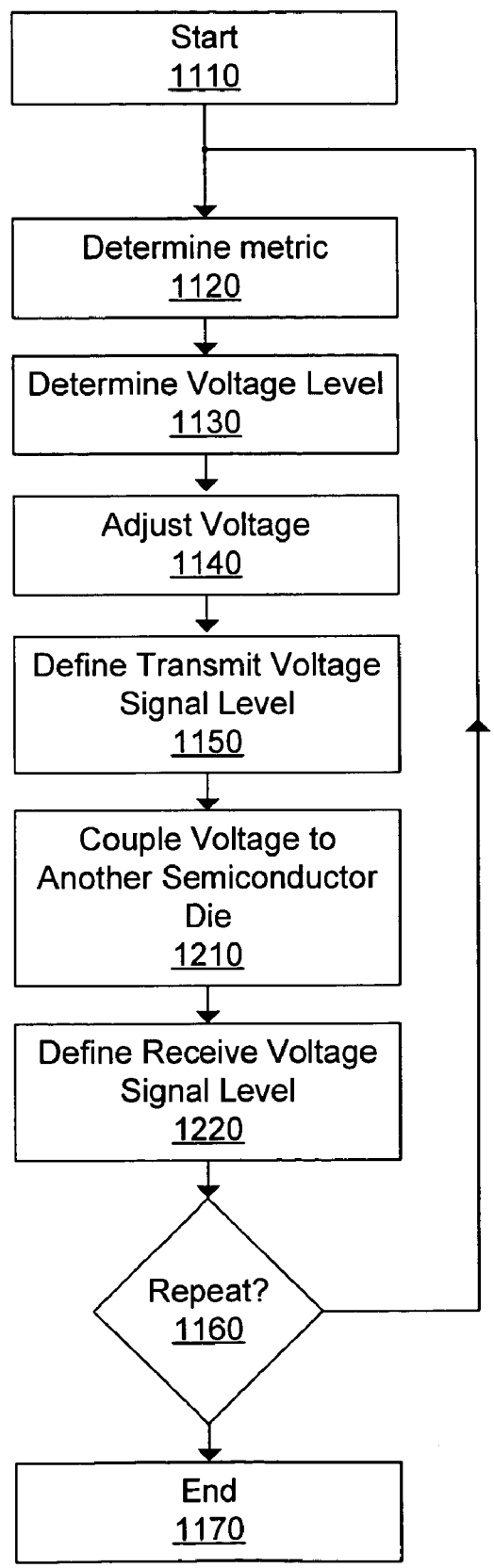
FIG. 12 is a flow diagram illustrating an embodiment of the present invention.

FIG. 12 is a flow chart summarizing a method or process of operating a system such as the system 200. This flowchart is the same as the one shown in FIG. 11, except as follows. After 1150, the transmit voltage is sent or coupled to another semiconductor die 1210. The voltage defines a receive voltage signal level 1220.

The metric determined at 1120 may include the voltage swing of the output from the second semiconductor device 112, the offset 750 of the output from the second semiconductor device 112, the duty cycle 760 of the output from the second semiconductor device 112, the attenuation of the output from the second semiconductor device 112 at high data rates, the voltage swing of the input to the second semiconductor device 112, the offset 750 of the input to the second semiconductor device 112, the duty cycle 760 of the input to the second semiconductor device 112, the attenuation of the input to the second semiconductor device 112 at high data rates, a reference voltage (e.g., a threshold voltage) used at the input to the second semiconductor device 112, the common voltage or the reference voltage Vcm 730 of the output from the second semiconductor device 112, the power consumption of the second semiconductor device 112, the temperature of the second semiconductor device 112, or the process used to manufacture the second semiconductor device 112.

FIG. 3 illustrates a system 300 that is a variation on the embodiment illustrated in FIG. 2. Note that the second characterization mechanism 168 in the second semiconductor device 112 in the system 300 is optional. In the system 300, instead of coupling the analog first voltage from the voltage generating mechanism 130 to the second semiconductor device 112, digital signals from the control logic 126 are coupled to a second voltage generating mechanism 156, in the second semiconductor device 112. Optionally, a calibration/conditioning circuit may modify the digital signals from the control logic 126 prior to coupling to the second voltage generating mechanism 156. Based on at least one of the values 116, 118, 120, 122, 166, the digital signals from the control logic 126 adjust a second voltage generated by the second voltage generating mechanism 156. The second voltage is coupled to the receive buffer 148 to define at least one receive voltage signal level for signal 150 communicated from the first semiconductor device 110 to the second semiconductor device 112 via interconnect 146. The second voltage may also be coupled to an optional second transmit buffer 152 to define at least one transmit voltage signal level for signal 154 to be communicated from the second semiconductor device 112 to the first semiconductor device 110 via interconnect 146. By adjusting the second voltage, and thus the transmit voltage signal level or the receive voltage signal level in the second semiconductor device 112, a performance metric of the system 300 is improved.

Note that the embodiment in FIG. 2 has an advantage relative to the embodiment in FIG. 3. In particular, losses in the voltage control line 142 and the interconnect 146 will track each other in the system 200 (shown in FIG. 2). This is not the case when digital signals are coupled between the first semiconductor device 110 and the second semiconductor device 112 via the voltage control line 142 as in the system 300.

Figure 4:
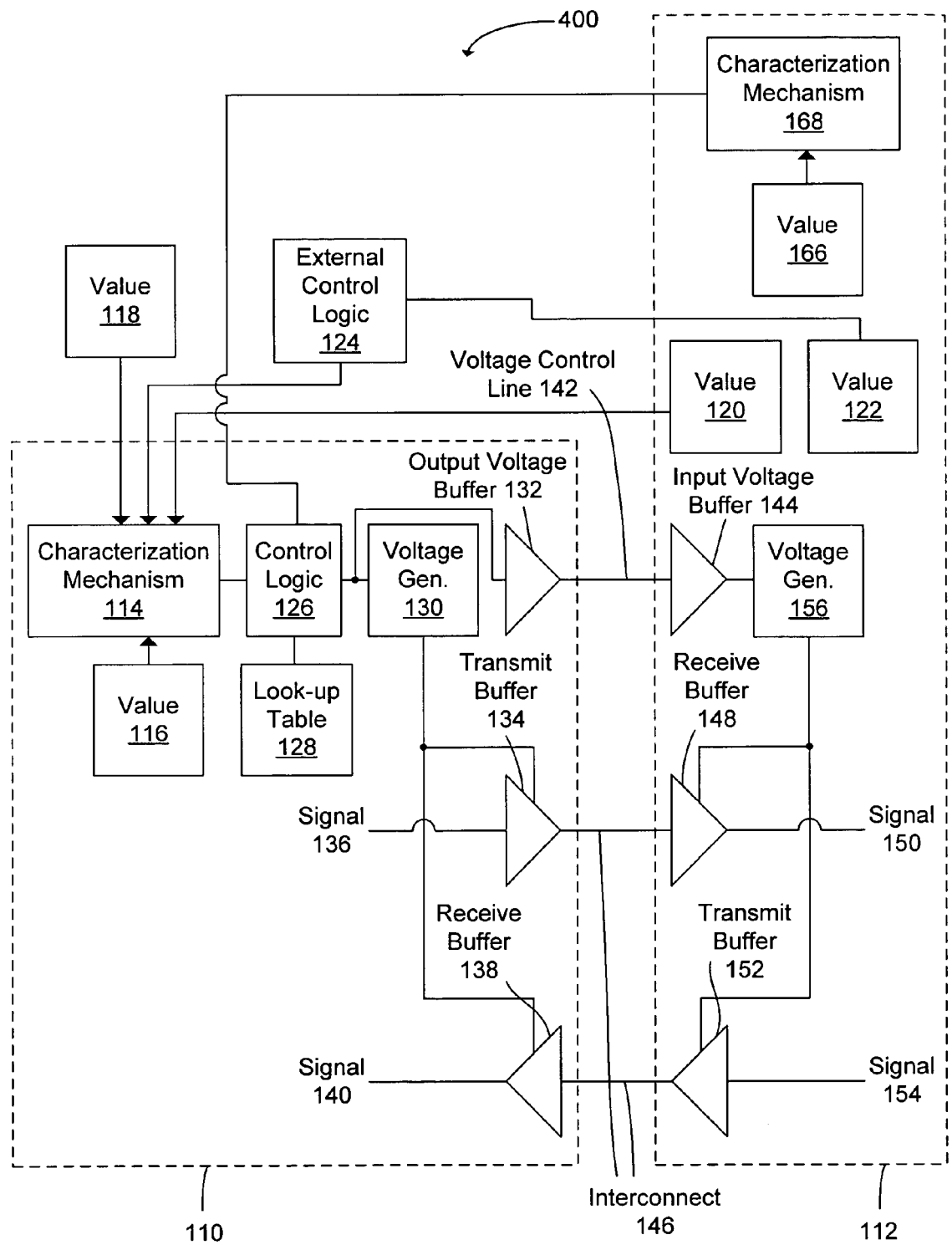
FIG. 4 is a block diagram illustrating an embodiment of the present invention.

FIG. 4 illustrates a system 400 that is a variation on the embodiment illustrated in FIG. 3. Note, once again, that the second characterization mechanism 168 in the second semiconductor device 112 in the system 400 is optional. In the system 400, the output voltage buffer 132 and the input voltage buffer 144 are included when coupling the digital signals from the control logic 126 to the second voltage generating mechanism 156. In a variation on system 400, the second voltage generating mechanism 156 may be a calibrating or a conditioning circuit for adjusting or offsetting the second voltage.

Embodiment 400 may be of use to compensate for high gate leakage. In particular, when the output voltage buffer 132 is driving a constant voltage there should be substantially little or no current output. If the loads presented by input voltage buffer 144 and receive buffer 148 are substantially identical, current output by the output voltage buffer 132 is, therefore, indicative of gate leakage offset. A magnitude of this current may be determined by the characterization mechanism 114. Control logic 126 may adjust the voltage generator 130 based on the magnitude of this current to compensate for this leakage current.

Figure 5:
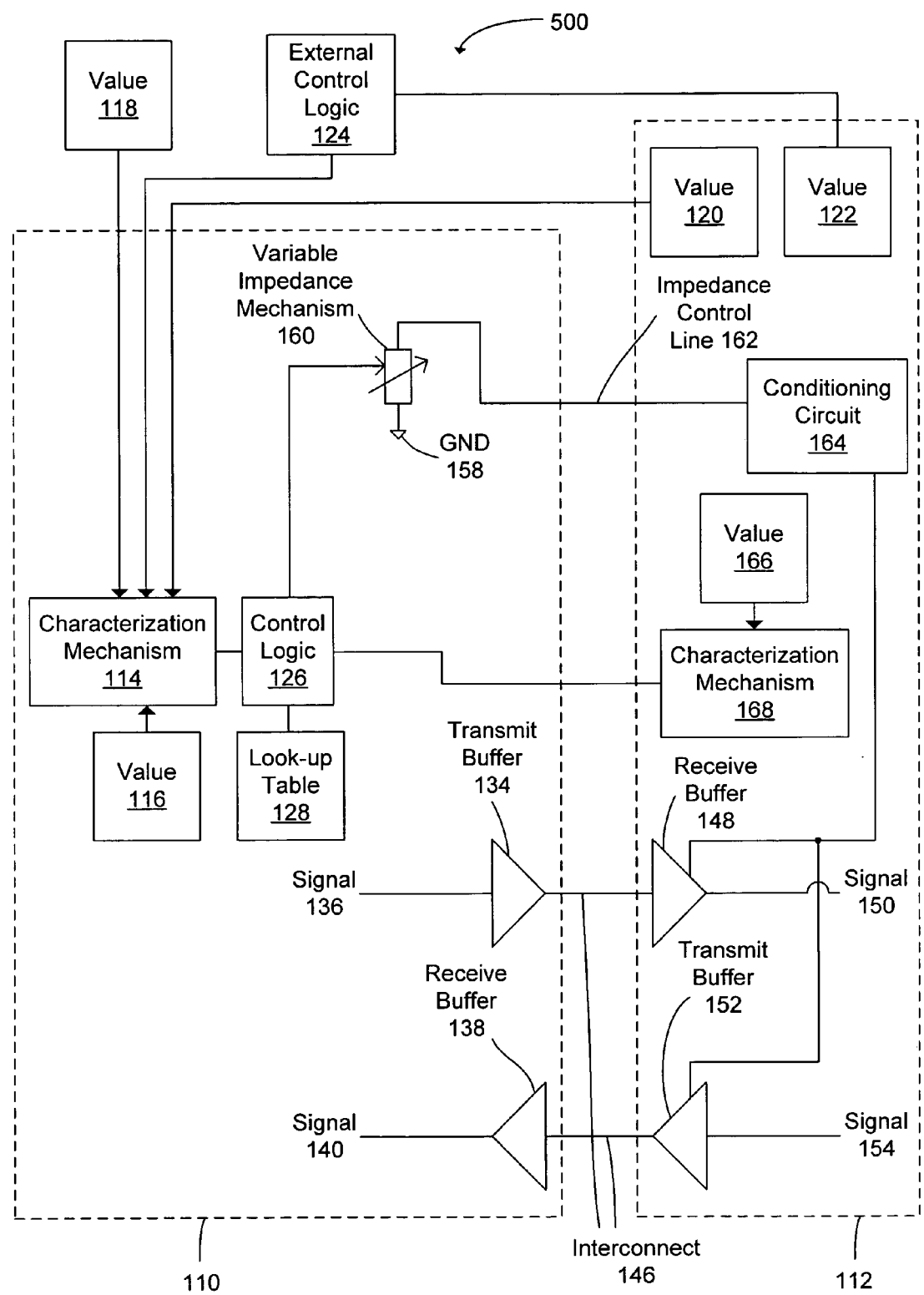
FIG. 5 is a block diagram illustrating an embodiment of the present invention.

FIG. 5 illustrates another embodiment, denoted here as system 500. The following description of system 500 addresses only those elements of system 500 which differ from those described above. In the system 500, the control logic 126 is coupled to an adjustable impedance mechanism 160. Based on at least one of the values 116, 118, 120, 122, 166, the control logic 126 adjusts the adjustable impedance mechanism 160 such that an impedance having a substantial dc (i.e., static) component is produced. One end of the impedance mechanism 160 may be coupled to a circuit ground (GND), denoted here as GND 158, or other reference voltage node. The other end of the impedance mechanism 160 is coupled to a conditioning circuit 164 in the second semiconductor device 112 via an impedance control line 162. The conditioning circuit 164 is coupled to the receive buffer 148 and/or the second transmit buffer 152. The conditioning circuit 164 adjusts at least a circuit condition in the receive buffer 148 and the transmit buffer 152. The conditioning circuit 164 may also adjust a plurality of circuit conditions. By adjusting the impedance of the adjustable impedance mechanism 160, and thus the circuit condition in the second semiconductor device 112, a performance metric of the system 500 is improved.

The conditioning circuit 164 may include a voltage, a current or an impedance-setting mechanism, such as voltage-controlled impedance or a digitally controlled impedance. The circuit condition may be a supply voltage or a voltage used in signaling between the first semiconductor device 110 and the second semiconductor device 112. The circuit condition may also include an impedance or a plurality or impedances, such as a termination impedance in the receive buffer 148, a driver impedance in the transmit buffer 152 or an on-die termination. Note that any of the transmit and/or receive buffers in the various embodiments may include on-die termination of the signal line or port to which the buffer is coupled.

Figure 9:
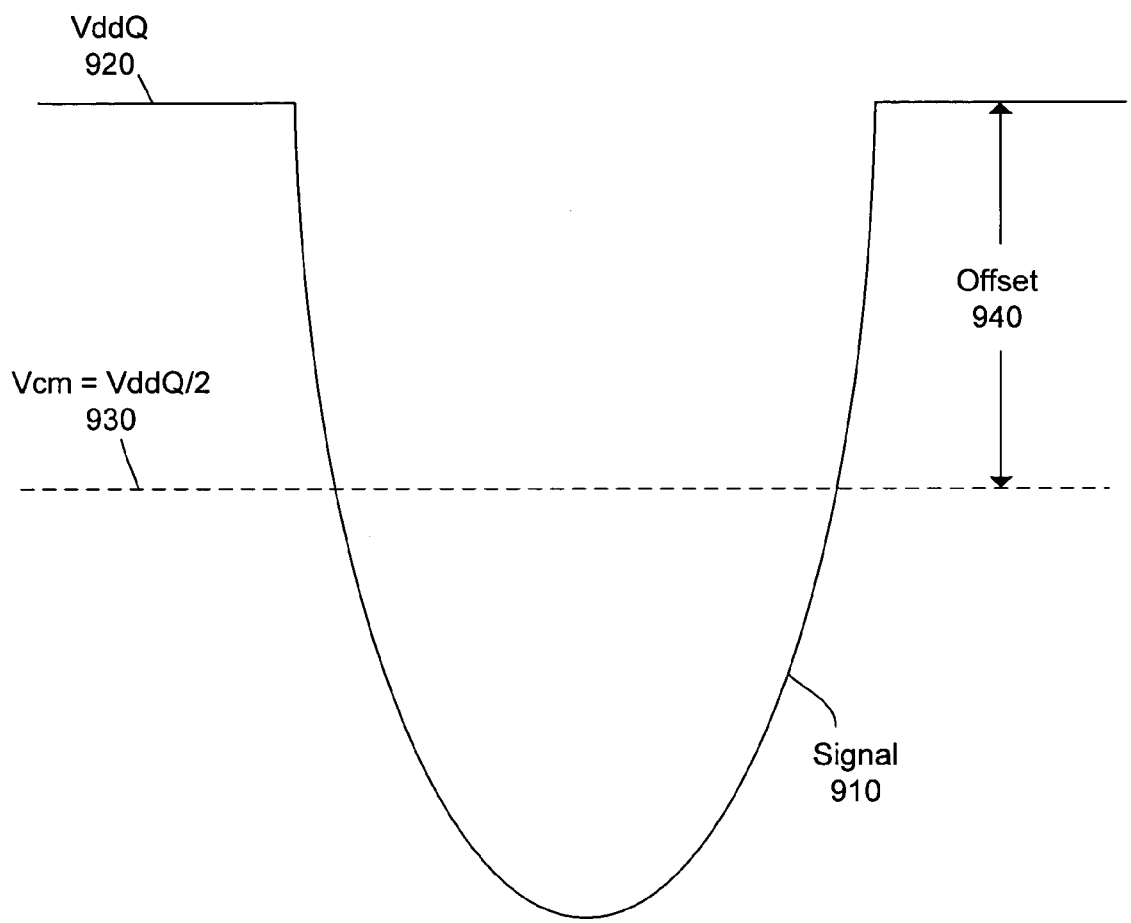
FIG. 9 illustrates voltage levels for signals in an embodiment of the present invention with a Series Stud Termination Level input-output interface.

Setting the termination impedance and the drive impedance in the second semiconductor device 112 based on the impedance in the first semiconductor device 110 is backwards compatible with a Series Stud Termination Level (SSTL) protocol, such as SSTL1.8 and SSTL 2.2. Such protocols are used in DDR3 DRAM. FIG. 9 illustrates a signal 910 in a system with SSTL protocol. Signaling levels in the system include a high-voltage level VddQ 920 and a reference voltage VddQ/2 930. Note that VddQ 920 is a termination voltage and that VddQ/2 930 is a common mode voltage. In this system, the voltage swing equals 2(VddQ−VddQ/2). The voltage swing may be adjusted by changing an adjustable resistor. For instance, the voltage swing may be proportional to the resistance of the adjustable resistor. In addition, the symmetry or offset 940 of the signal 910 may be adjusted by changing the reference voltage VddQ/2 930. This will also change the threshold voltage of the input to the system.

Figure 13:
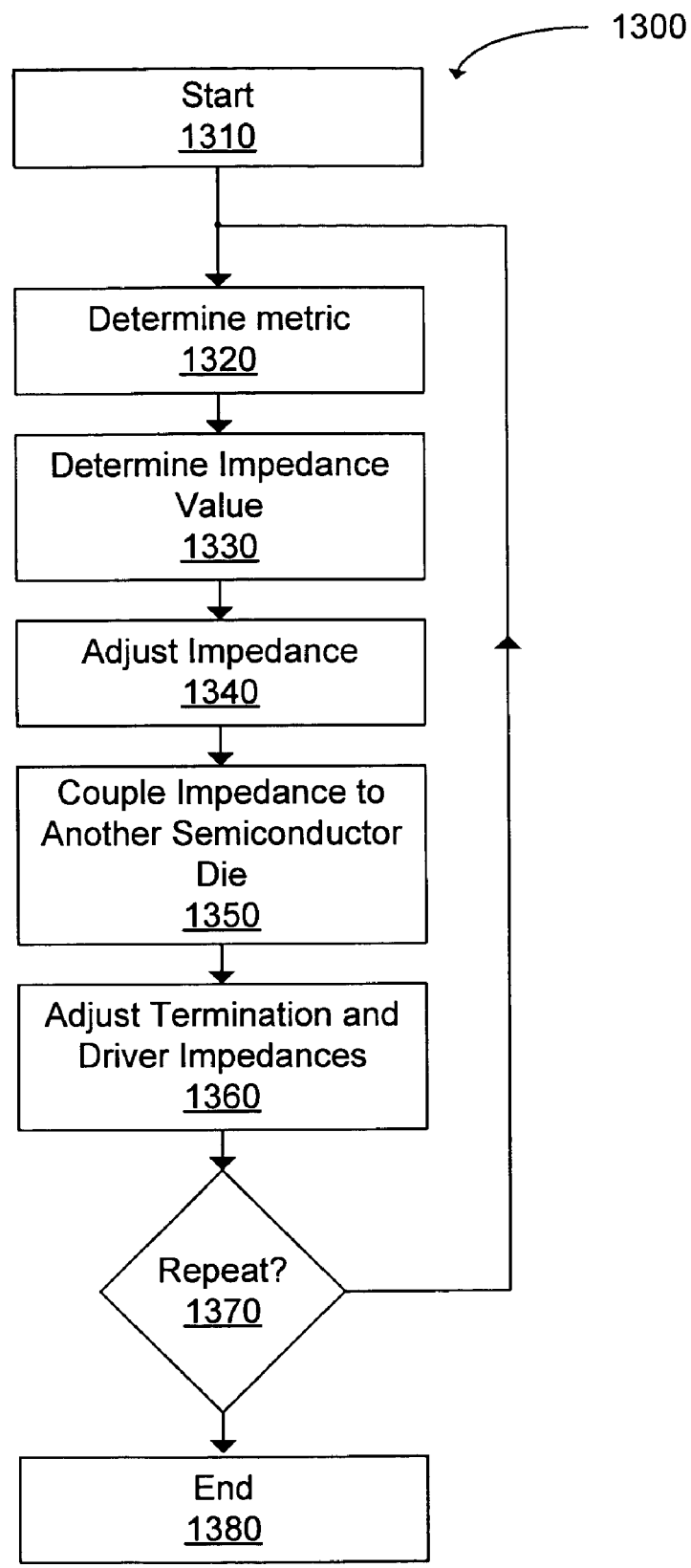
FIG. 13 is a flow diagram illustrating an embodiment of the present invention.

FIG. 13 is a flow chart 1300 summarizing a method of operating a system, such as the system 500. After starting 1310, a metric, related to a performance metric to be improved, is determined 1320. Based on at least this metric, an impedance value is determined 1330. An impedance is adjusted 1340 based on the determined impedance value. The impedance is coupled to another semiconductor die 1350. Termination and driver impedances in another semiconductor die are adjusted 1360. A decision is made to determine if the stages of the method should be repeated 1370. If yes, the stages of the method repeat, and otherwise the method or process ends 1380.

Figure 6:
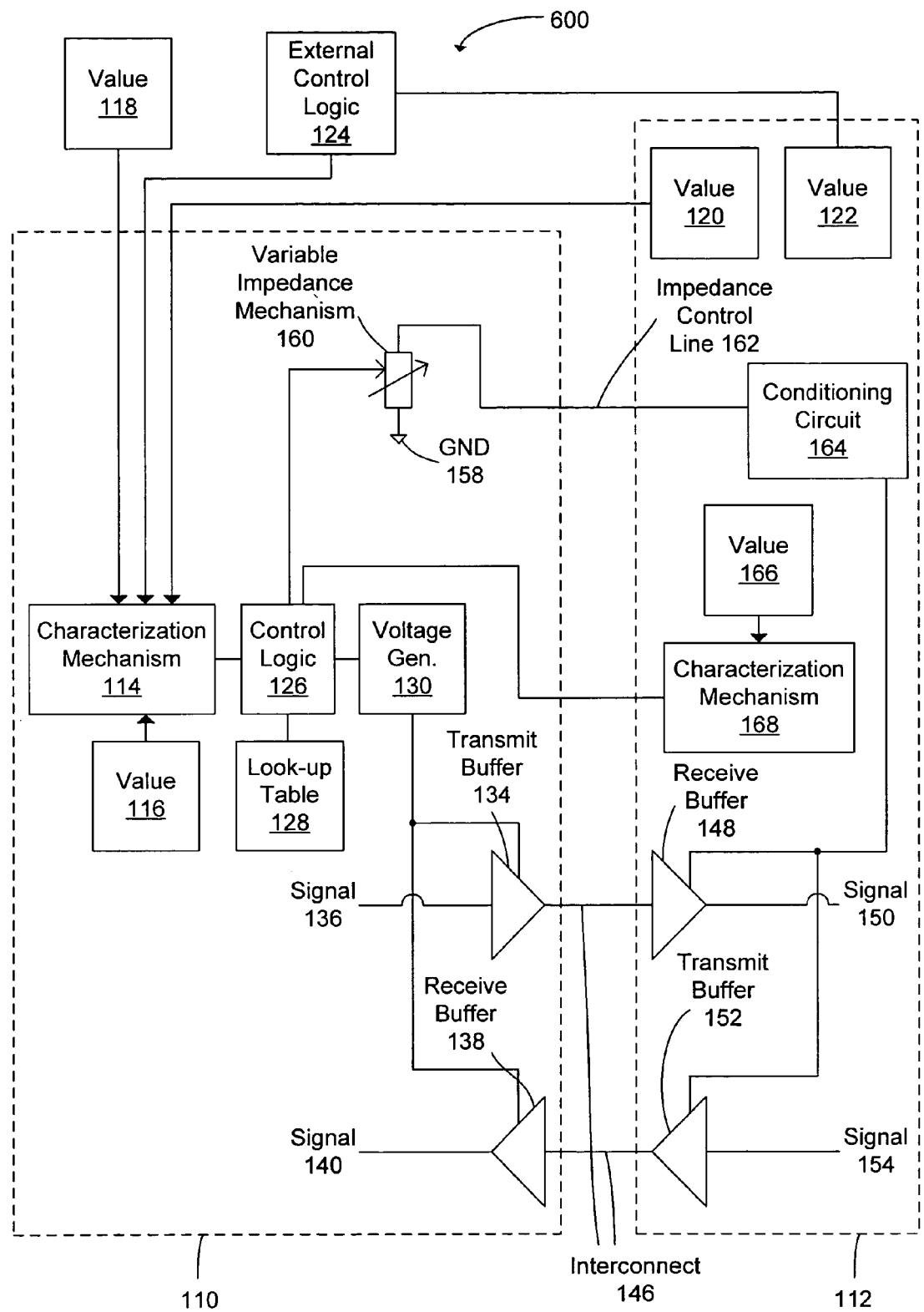
FIG. 6 is a block diagram illustrating an embodiment of the present invention.

FIG. 6 illustrates a system 600 that is a variation on the embodiment of the present invention illustrated in FIG. 5. The control logic 126 adjusts the impedance of the adjustable impedance mechanism 160 as in the system 500 (shown in FIG. 5). In addition, as shown in the system 200 (shown in FIG. 2), the system 300 (shown in FIG. 3) and the system 400 (shown in FIG. 4), the control logic 126 adjusts the first voltage generated by voltage generating mechanism 130 based on at least one of the values 116, 118, 120, 122 and 166. The system 600 may include an optional second characterization mechanism 168. The system 600 may also include an optional second voltage generating mechanism, such as the second voltage generating mechanism 156, as shown in the system 300 (shown in FIG. 3) and the system 400 (shown in FIG. 4). The first voltage in the system 600 may include Vterm, Voh, Vol or Vcm.

In an exemplary embodiment of the present invention, one of the values 116, 118, 120, 122 or 166 determined by the first characterization mechanism 114 or the second characterization mechanism 168 is the data rate of data transmissions between the first device 110 and another device 112. The first voltage generated by the voltage generating mechanism 130 or the second voltage generated by the second voltage generating mechanism 156 is Vol 740. The control logic 126 adjusts Vol (e.g., see Vol 740 in FIG. 7) and thereby the voltage swing to correct for attenuation of signals at high frequencies, by using the data rate as one of the bases for adjusting Vol. The performance metric that is improved is an error rate in a communication channel.

Alternatively, one of the values 116, 118, 120, 122 or 166 determined by the first characterization mechanism 114 or the second characterization mechanism 168 is power consumption, or a value indicative of power consumption by the first or second device 110 or 112. The first voltage generated by the first voltage generating mechanism 130 or the second voltage generated by the second voltage generating mechanism 156 is Vcm (e.g., see Vcm 730 in FIG. 7). The control logic 126 adjusts Vcm to minimize the power consumed. In this example, the performance metric that is improved is the power consumption.

In another example, one of the values 116, 118, 120, 122 or 166 determined by the first characterization mechanism 114 or the second characterization mechanism 168 is the offset (e.g., offset 750 in FIG. 7). The first voltage generated by the first voltage generating mechanism or the second voltage generated by the second voltage generating mechanism 156 is Vcm 730. The control logic 126 adjusts Vcm to set a desired offset, and thereby adjusts the duty cycle (e.g., duty cycle 760 in FIG. 7), where the offset and the duty cycle are related by the slew rate of the signal. In this case, the performance metric that is improved is the timing margin.

Other possibilities include:
a) reducing Voh 720 but maintaining the voltage swing by adjusting Vcm 730 and Vol 740;
b) adjusting the voltage swing based on system information such as a routing length of the communications channel;
c) coupling I/O interfaces with different signaling technology and different termination voltages and common mode Vcm 730 in a bi-modal application;
d) optimizing the voltage swing based on a calibration algorithm to achieve a maximum voltage and timing margin at the receive buffer 138 or the receive buffer 148. This may be used in conjunction with timing and equalization calibration;
e) channel voltage margining by using different voltages for signaling, such as Voh 720, Vcm 730 and/or Vol 740, in the transmit buffer 134 or the transmit buffer 152 and the receive buffer 138 or the receive buffer 148;
f) reducing the voltage swing when the receive buffer 138 or the receive buffer 148 has extra input voltage (Vin) gain or if the attenuation in the communication channel is not significant, which may occur in a short communication channel;
g) adjusting Vin at the receive buffer 138 or the receive buffer 148 based on an activity level of a processor. The processor activity level may be determined, for example, from the power consumption, the amount of noise, a PC bus receiving flag or a DRAM core busy flag;
h) adjusting the voltage swing in a SSTL protocol, such as that used in DDR3 DRAM, to reduce the power consumption and prevent the I/O interface requirements from limiting the data rate.

Figure 10:
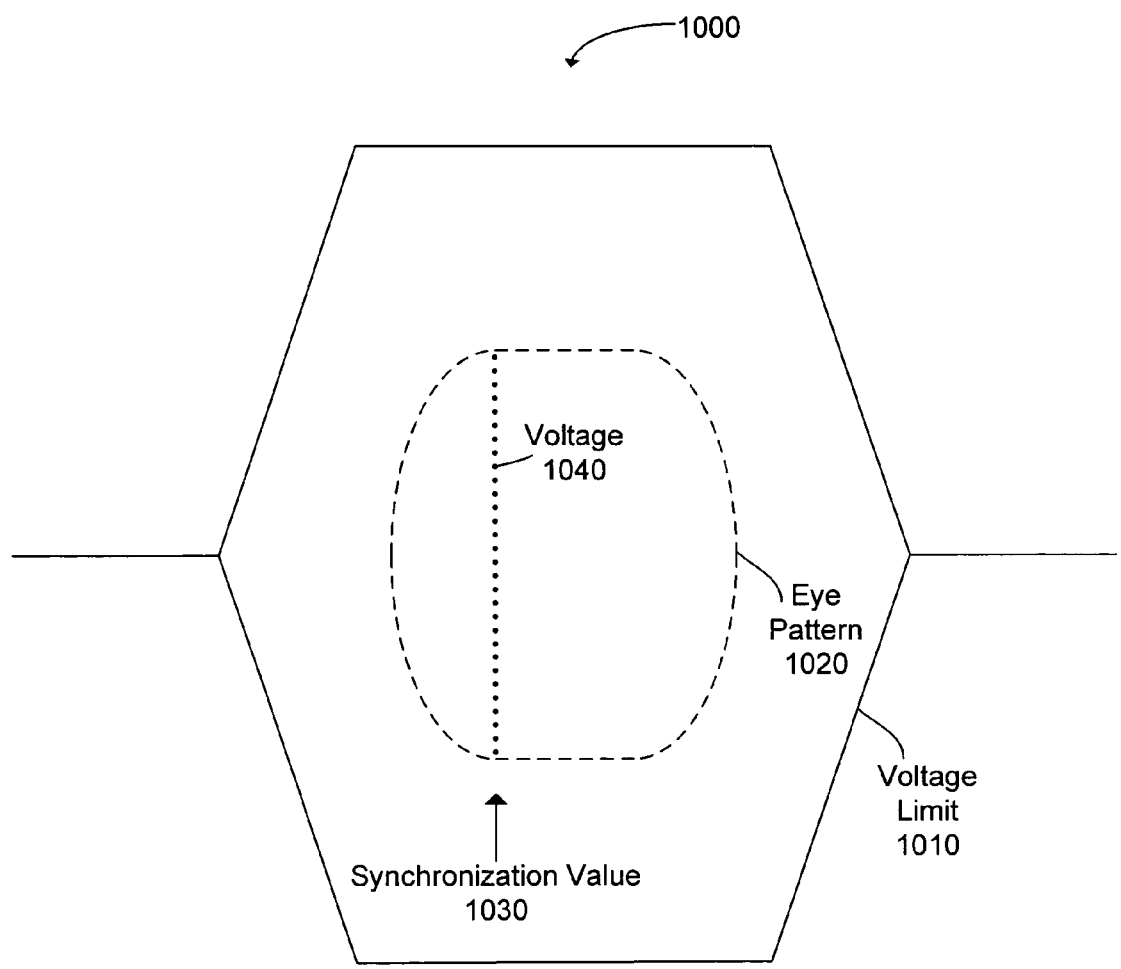
FIG. 10 illustrates determining a window in an eye pattern in an embodiment of the present invention.

FIG. 10 illustrates another application 1000 of the embodiments of the present invention. An operating voltage margin within a voltage limit 1010 is determined by varying a voltage 1040 at a synchronization value 1030 of a clock. By determining the operating voltage margin at a series of synchronization values, the timing margin can also be determined. In other words, the synchronization value 1030 may be adjusted so as to sweep over a range of values, and operating voltage margins may be determined for each of the synchronization values. The set of determined operating voltage margins at the different synchronization values define an eye pattern 1020. In this way, the eye pattern 1020 may be determined.

In the context of the embodiments described above, the voltage 1040 may be the first voltage in the first semiconductor device 110 or the second voltage in the second semiconductor device 112. In some embodiments, there are at least two voltage generators, such as voltage generator 130, that are separately coupled to output voltage buffer 132 and transmit buffer 134. Alternatively the voltage may be varied by changing a circuit condition based on an adjustable impedance in the first semiconductor device 110, as illustrated in FIGS. 5 and 6. In the case of impedance adjustment, rather than sweeping the voltage 1040 across the eye pattern 1020, the eye pattern 1020 contracts or expands as the impedance is adjusted.

Referring to FIG. 2, the first voltage may define the transmit voltage signal level in the transmit buffer 134. The clock corresponding to the synchronization value 1030 is generated. A test signal, such as the signal 136, based on a stored predetermined pattern and the clock are communicated from the first semiconductor device 110 to the second semiconductor device 112 using the transmit voltage signal level in the transmit buffer 134. The test signal is received by the second semiconductor device 112. Receive voltage signal levels in the receive buffer 148 may be set conservatively to ensure that any errors in the signal 150 that is received are not associated with these levels. A return signal, such as the signal 154, based on the test signal received is transmitted from the second semiconductor device 112 to the first semiconductor device 110. Transmit voltage signal levels in the transmit buffer 152 may be set conservatively to ensure that any errors in the signal 154 that is transmitted are not associated with these levels. The return signal is received by the first semiconductor device 110. Once again, receive voltage signal levels in the receive buffer 138 may be set conservatively to ensure that any errors in the signal 140 that is received are not associated with these levels. A pattern corresponding to the return signal is compared to the stored predetermined pattern. This process is repeated at different values of the transmit voltage signal level in the transmit buffer 134 to generate a voltage line at the synchronization value 1030 in the eye pattern 1020 shown in FIG. 10. The process may also be repeated at different synchronization values to determine the eye pattern 1020. In particular, when the process results in a value inside of the eye pattern 1020 it corresponds to successful communication. Values outside of the eye pattern 1020 correspond to unsuccessful communication. Based on the eye pattern 1020, the synchronization value 1030 and the voltage level 1040 may be set to values at or near the center of the eye pattern 1020 where margin is optimal.

The process may be repeated for a plurality of first voltages, including Vterm, Voh, Vol and Vcm, or any subset thereof, so as to vary transmit voltage signal levels, thereby allowing a series of eye patterns to be determined. In the process, the first voltage may instead define a transmit voltage signal level in the transmit buffer 152 while all other transmit voltage signal levels and receive voltage signal levels are set conservatively. Alternatively, the first voltage may instead define a receive voltage signal level in the receive buffer 138 or the receive buffer 148 while all other transmit voltage signal levels and receive voltage signal levels are set conservatively. In addition, in a variation of the process, the transmit signal level and the receive signal level in the second semiconductor device 112 may be defined by the second voltage produced by voltage generating mechanism 156 (see FIG. 3).

From a systems performance perspective, the scalable I/O interface signaling systems and methods describe above offer numerous improvements. A scalable technology increases design portability. It allows optimization of I/O power consumption based on performance requirements and specific application. The scalable technology limits the need to increase the output voltage swing in an attempt to alleviate the effect of attenuation. It offers a degree of backwards compatibility. It enables improved communication in a bi-modal design. And it provides a mechanism for facility testing, characterization and voltage margining.

The scalable I/O interface signaling technology for communication between semiconductor devices is applicable in DRAM. It is also of use in static random access memory (SRAM) and electrically erasable programmable read-only memory (EEPROM). The scalable I/O interface signaling technology may be used in systems with electrical, optical or electrical and optical interconnects.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system, comprising:
   a first semiconductor device, including:
      a first characterization mechanism;
      a control logic coupled to the first characterization mechanism;
      a first voltage generating mechanism coupled to the control logic; and
      a first transmit buffer;
   wherein the control logic adjusts at least a first voltage generated by the first voltage generating mechanism based on at least a value determined by the first characterization mechanism, and wherein the first voltage is coupled to the first transmit buffer to define at least a transmit voltage signal level; and
   a second semiconductor device including:
      a receive buffer to receive data using a reference voltage; and
      a second voltage generating mechanism; and
   a control line to communicate information from the control logic in the first semiconductor device to the second voltage generating mechanism in the second semiconductor device, the information to indicate an adjustment to be applied to the reference voltage.

2. The system of claim 1, wherein the first characterization mechanism includes at least one mechanism selected from the group consisting of a manufacturing process detector, a voltage calibration logic, a voltage margining control, a processor activity detecting mechanism, a data rate detecting mechanism, a power state detecting mechanism, a PC Bus receiving detector and a DRAM core busy detector.

3. The system of claim 1, wherein the first characterization mechanism includes a plurality of mechanisms selected from the group consisting of a manufacturing process detector, a voltage calibration logic, a voltage margining control, a processor activity detecting mechanism, a data rate detecting mechanism, a power state detecting mechanism, a PC Bus receiving detector and a DRAM core busy detector.

4. The system of claim 1, further comprising a look-up table coupled to the control logic, wherein the control logic determines the adjustment to the first voltage from the look-up table based at least on the value determined by the first characterization mechanism.

5. The system of claim 1, wherein the control logic adjusts the first voltage at substantially intermittent time intervals.

6. The system of claim 1, wherein the control logic adjusts the first voltage at substantially periodic time intervals.

7. The system of claim 1, wherein the control logic is included in a feedback loop.

8. The system of claim 1, wherein the first voltage is selected from the group consisting of a termination voltage (Vterm), a high-voltage (Voh), a low-voltage (Vol) and a common voltage (Vcm).

9. The system of claim 1, further comprising a first receive buffer in the first semiconductor device, wherein the first voltage is coupled to the first receive buffer to define at least a receive voltage signal level.

10. The system of claim 1, the second semiconductor device including an input buffer;
the system further comprising:
an output voltage buffer in the first semiconductor device; and
an interconnect having at least one voltage control line, the interconnect coupled at one end to the first semiconductor device and coupled at another end to the second semiconductor device, wherein the first voltage in the first semiconductor device is coupled to the receive buffer in the second semiconductor device via the output voltage buffer, the voltage control line in the interconnect and the input voltage buffer of the second semiconductor device, and thereby defines at least a receive voltage signal level for at least one signal communicated from the first semiconductor device to the second semiconductor device via the first transmit buffer, the interconnect and the receive buffer.

11. The system of claim 10, further comprising a second transmit buffer in the second semiconductor device, wherein the first voltage is coupled to the second transmit buffer and thereby defines at least a transmit voltage signal level for at least one signal communicated from the second semiconductor device to the first semiconductor device.

12. The system of claim 10, further comprising a second characterization mechanism in the second semiconductor device, wherein the control logic adjusts at least the first voltage generated by the first voltage generating mechanism based on at least another value determined by the second characterization mechanism.

13. The system of claim 10, further comprising:
an output buffer in the first semiconductor device coupled to the control logic and to one end of the voltage control line in the interconnect.

14. The system of claim 1, wherein the second voltage generating mechanism generates a second voltage selected from the group consisting of a termination voltage (Vterm), a high-voltage output reference voltage (Voh), a low-voltage output reference voltage (Vol) and a common mode reference voltage (Vcm).

15. The system of claim 14, wherein the control logic adjusts the second voltage at substantially intermittent time intervals.

16. The system of claim 14, wherein the control logic adjusts the second voltage at substantially periodic time intervals.

17. A system, comprising:
a first semiconductor device, including:
a first characterization mechanism;
a control logic coupled to the first characterization mechanism;
a first transmit buffer;
a first receive buffer; and
an adjustable impedance mechanism coupled to the control logic and configured to produce an impedance having a substantial dc component, the impedance having a value based on at least a value determined by the first characterization mechanism;
a second semiconductor device, including:
a second transmit buffer;
a second receive buffer; and
a conditioning circuit; and
an interconnect having at least one impedance control line, the interconnect coupled at one end to the first semiconductor device and at another end to the second semiconductor device,
wherein the conditioning circuit is configured to adjust at least a circuit condition of the second transmit buffer and second receive buffer in accordance with the impedance produced by the adjustable impedance mechanism.

18. The system of claim 17, further comprising a second characterization mechanism in the second semiconductor device, wherein the impedance of the adjustable impedance has a value based on at least another value determined by the second characterization mechanism.

19. The system of claim 17, wherein the circuit condition adjusted by the conditioning circuit is selected from the group consisting of a supply voltage and a voltage used in signaling.

20. The system of claim 17, wherein the circuit condition adjusted by the conditioning circuit is an impedance.

21. The system of claim 17, wherein the first characterization mechanism includes at least one mechanism selected from the group consisting of a manufacturing process detector, a voltage calibration logic, a voltage margining control, a processor activity detecting mechanism, a data rate detecting mechanism, a power state detecting mechanism, a PC Bus receiving detector and a DRAM core busy detector.

22. The system of claim 17, wherein the first characterization mechanism includes a plurality of mechanisms selected from the group consisting of a manufacturing process detector, a voltage calibration logic, a voltage margining control, a processor activity detecting mechanism, a data rate detecting mechanism, a power state detecting mechanism, a PC Bus receiving detector and a DRAM core busy detector.

23. The system of claim 17, further comprising a look-up table coupled to the control logic, wherein the control logic determines the desired adjustment to the impedance of the adjustable impedance mechanism from the look-up table based on the value determined with the first characterization mechanism.

24. The system of claim 17, wherein the control logic is included in a feedback loop.

25. The system of claim 17, wherein the control logic adjusts the impedance of the adjustable impedance mechanism at substantially intermittent time intervals.

26. The system of claim 17, wherein the control logic adjusts the impedance of the adjustable impedance mechanism at substantially periodic time intervals.

27. The system of claim 17, wherein the adjustable impedance mechanism includes a voltage-controlled impedance.

28. The system of claim 17, wherein the adjustable impedance mechanism includes a digitally controlled impedance.

29. The system of claim 17, further comprising:
a voltage generating mechanism in the first semiconductor device,
wherein the control logic adjusts at least a first voltage generated by the voltage generating mechanism based on at least a value determined by the first characterization mechanism, the first voltage is coupled to the first transmit buffer to define at least a transmit voltage signal level for at least one signal communicated from the first semiconductor device to the second semiconductor device via the first transmit buffer, the interconnect and the second receive buffer, the first voltage is also coupled to the first receive buffer to define at least a receive voltage signal level for at least one signal communicated from the second semiconductor device to the first semiconductor device via the second transmit buffer, the interconnect and the first receive buffer.

30. The system of claim 29, further comprising a look-up table coupled to the control logic, wherein the control logic determines the desired adjustment to the first voltage from the look-up table based on the value determined with the first characterization mechanism.

31. The system of claim 29, further comprising a second characterization mechanism in the second semiconductor device, wherein the control logic adjusts at least the first voltage generated by the first voltage generating mechanism based on at least another value determined by the second characterization mechanism.

32. The system of claim 29, wherein the control logic adjusts the first voltage at substantially intermittent time intervals.

33. The system of claim 29, wherein the control logic adjusts the first voltage at substantially periodic time intervals.

34. The system of claim 29, wherein the first voltage is selected from the group consisting of a termination voltage (Vterm), a high-voltage (Voh), a low-voltage (Vol) and a common voltage (Vcm).

* * * * *